US006259740B1

(12) United States Patent
Lyu

(10) Patent No.: US 6,259,740 B1
(45) Date of Patent: Jul. 10, 2001

(54) MOVING PICTURE EXPERTS GROUP VIDEO DECODING APPARATUS AND METHOD FOR SUPPORTING REPLAY

(75) Inventor: Hwa Young Lyu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/143,353

(22) Filed: Aug. 28, 1998

(30) Foreign Application Priority Data

Aug. 30, 1997 (KR) .................................................. 97-43538

(51) Int. Cl.⁷ ...................................................... H04N 7/12
(52) U.S. Cl. ...................................................... 375/240.25
(58) Field of Search ......................... 375/240.25, 240.26; 348/419.1, 425.1; 386/27, 33, 109, 123

(56) References Cited

U.S. PATENT DOCUMENTS

| | | | | |
|---|---|---|---|---|
| 5,298,992 | * | 3/1994 | Pietras et al. | 348/415 |
| 5,502,494 | * | 3/1996 | Auld | 348/426 |
| 5,523,799 | * | 6/1996 | Hattori et al. | 348/715 |
| 5,543,927 | * | 8/1996 | Herz | 386/6 |
| 5,742,347 | * | 4/1998 | Kandlur et al. | 348/426 |
| 5,801,777 | * | 9/1998 | Lyu | 375/240.25 |
| 5,856,973 | * | 1/1999 | Thompson | 370/389 |
| 5,864,646 | * | 1/1999 | Searby | 386/68 |
| 5,969,763 | * | 10/1999 | Sakamoto | 348/390 |
| 6,012,091 | * | 1/2000 | Boyce | 709/219 |
| 6,081,649 | * | 6/2000 | Asamura et al. | 386/81 |
| 6,177,961 | * | 1/2001 | Blatter | 348/563 |
| 6,185,340 | * | 2/2001 | Comer | 382/236 |

OTHER PUBLICATIONS

Sarginson, P.A., "MPEG–2: a tutorial introduction to the systems layer", IEE Colloquium on MPEG–2, 1995.*

* cited by examiner

*Primary Examiner*—Vu Le
(74) *Attorney, Agent, or Firm*—Fleshner & Kim, LLP

(57) ABSTRACT

An MPEG video decoding method using an MPEG video decoding apparatus having a memory for storing a predetermined amount of video bit streams data to support replay, the method comprising the steps of: when in a replay mode, discarding the input video bit stream, instead of storing it in the memory which stores a predetermined amount of the input bit stream to be video-decoded and/or replayed, resulting in fix of a write address pointer; storing an address of a read address pointer in a replay read address pointer and storing an address of the write address pointer in the read address pointer; and subsequently reading and decoding a bit stream starting with a portion corresponding to the address of the read address pointer which is given by the address of the write address pointer while increasing the read address pointer, thereby performing the replay.

23 Claims, 4 Drawing Sheets

MOVING PICTURE EXPERTS GROUP VIDEO DECODING APPARATUS AND METHOD FOR SUPPORTING REPLAY

BACKGROUND OF THE INVENTION

1. Field of the Invention

The present invention relates to a decoding apparatus in a digital television and more particularly to a moving picture experts group (MPEG) video decoding apparatus and method for supporting replay.

2. Discussion of Related Art

It is essential technology in the age of multi-media how efficiently treating and processing integrated video, voice, and data. An MPEG is an international standard for compressed coding of digital moving pictures which is most essential technology in such multi-media environment. In other words, technology of video compression and reconstruction including the MPEG has been essential technology in the multi-media age and settled down as a standard for a digital video disc (DVD) and a future digital television.

Therefore, development of related technology or application technology is substantial to secure international competitiveness in this field in the future.

Presently, for digital televisions oriented to the United States of America, MPEG compression and reconstruction conforming to a high definition (HD) class is determined as a standard, and the MPEG is settled down as a standard or an actual standard in other digital TV markets.

This means that an existing analog TV such as an NTSC is being slowly replaced by the digital TV.

This digital TV which is replacing the existing analog TV should be guaranteed to be have excellency in various multi-media functions as well as picture quality or sound.

In this regard, the digital TV must be able to support additional functions to extra functions of the existing expensive analog TV as well as basic picture display and sound. In other words, users familiar with the extra functions of the analog TV are supposed to expect more various functions, so how well meeting this expectation is important in making success of the digital TV earlier.

If an MPEG video decoder is applied to the digital TV, a consecutive bit stream received in real time will be displayed on a screen in regular sequent. When a user passes by a scene which he/she is interested in, he/she may have a desire to replay the part or, when necessary, store the part to see later.

For example, when a necessary telephone number is displayed during a commercial broadcast attracting the user's attention, the user may want to replay to identify a relevant part and, when necessary, store the part in a recording medium to see it later.

However, there is a problem in the general digital TV that a scene which has been played once cannot be replayed.

SUMMARY OF THE INVENTION

Accordingly, the present invention is directed to an MPEG video decoding apparatus and method for supporting replay that substantially obviates one or more of the limitations and disadvantages of the related art.

An objective of the present invention is to provide an MPEG video decoding apparatus and method for supporting a replay function by expanding memory without addition of complicated hardware.

Another objective of the present invention is to provide an MPEG video decoding apparatus and method for displaying much amount of previous picture image with limited memory by compressing a video bit stream which is stored for use during replay.

Further another objective of the present invention is to provide an MPEG video decoding apparatus and method for outputting a video bit stream which is read from a memory for replay to an outer storage medium when a store command is entered during a replay mode.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, an MPEG video decoding apparatus for supporting replay includes: a memory for storing a predetermined amount of an input video bit stream which will be decoded and/or replayed; a buffer controller for controlling write of an input video bit stream to the memory and read of a video bit stream stored in the memory; and a video decoder for MPEG-decoding a bit stream which is read from the memory by the buffer controller.

The memory is formed in such a manner of expanding a video buffering verification buffer for replay.

The memory comprises: a write address pointer for designating a next write address by increasing its value by one when a bit stream corresponding to a single word has been written; a read address pointer for designating a next read address by increasing its value by one when a bit stream corresponding to a single word has been read; and a replay read address pointer for storing an address of the read address pointer according to start of a replay mode. If a replay command is entered, the buffer controller fixes the write address pointer, stores an address of the read address pointer in the replay read address pointer, jumps the read address pointer to an address designated by the write address pointer, and subsequently reads a bit stream starting with a portion corresponding to the address to which the read address pointer is jumped, before sending it to the video decoder.

The buffer controller jumps the read address pointer to an address of the write address pointer when an address of the read address pointer is equal to an address of the replay read address pointer.

If the replay mode is released, the buffer controller stores an address of the replay read address pointer in the read address pointer, stores an input bit stream in the memory increasing the write address pointer, and reads a bit stream corresponding to an address designated by the read address pointer increasing the read address pointer.

The MPEG video decoding apparatus according to the present invention further comprises a store bit stream output unit for receiving and storing a video bit stream read from the memory during a replay mode and sending it to an outer storage medium of large capacity according to a store command.

In another aspect of the present invention, an MPEG video decoding method for supporting replay comprises the steps of: when in a replay mode, discarding the input video bit stream, instead of storing it in a memory which stores a predetermined amount of the input bit stream to be video-decoded and/or replayed, resulting in fix of a write address pointer; storing an address of a read address pointer in a replay read address pointer and storing an address of the write address pointer in the read address pointer; and subsequently reading and decoding a bit stream starting with a portion corresponding to the address of the read address pointer which is given by the address of the write address pointer while increasing the read address pointer, thereby performing the replay.

The reading and decoding step comprises the steps of: determining whether a normal play command is entered during a replay mode; if the normal play command is not entered, determining whether a current address of the read address pointer is equal to the address of the replay read address pointer; and if the two addresses are equal to each other, storing the address of the write address pointer in the read address pointer and reading and decoding the video bit stream corresponding to the address designated by the read address pointer which is given by the address of the write address pointer.

The MPEG video decoding method further comprises the step of storing the address of the replay read address pointer in the read address pointer, storing an input bit stream so as to increase the write address pointer, and reading a bit stream corresponding to the address designated by the read address pointer so as to increase the read address pointer when the normal play command is entered.

A video bit stream which has been read is sent to an outer storage medium of large capacity when a store command is entered during the replay mode.

In further another aspect of the present invention, an MPEG video decoding apparatus for supporting replay comprises: a memory divided into a video buffering verification (VBV) buffer area and a replay buffer area, for storing a video bit stream to be video-decoded in the VBV buffer area and storing a video bit stream to be replayed in the replay buffer area in regular sequence; a buffer controller for controlling write of an input video bit stream to the memory and read of a video bit stream stored in the memory; a video decoder for MPEG-decoding a bit stream which is read from the VBV buffer area or the replay buffer area in the memory by the buffer controller; and a bit stream compressor for compressing the bit stream transmitted from the VBV buffer area in the memory according to control of the buffer controller and sending a compressed bit stream via the buffer controller to the replay buffer area in the memory.

The bit stream compressor sends a whole bit stream as it is, only intra-frame (I-frame) data and predict frame (P-frame) data, or only I-frame data of the input bit stream to the replay buffer area in the memory via the buffer controller.

The MPEG video decoding apparatus further comprises a store bit stream output unit for receiving and storing a video bit stream read from the replay buffer area in the memory during a replay mode and sending it to an outer storage medium of large capacity according to a store command.

According to this MPEG video decoding apparatus and method for supporting a replay function, a user can replay previous scenes which have been displayed or store the scenes to watch them later while watching digital television.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

Preferred embodiments of this invention will be described in detail with reference to the accompanying drawings.

Figure 1:
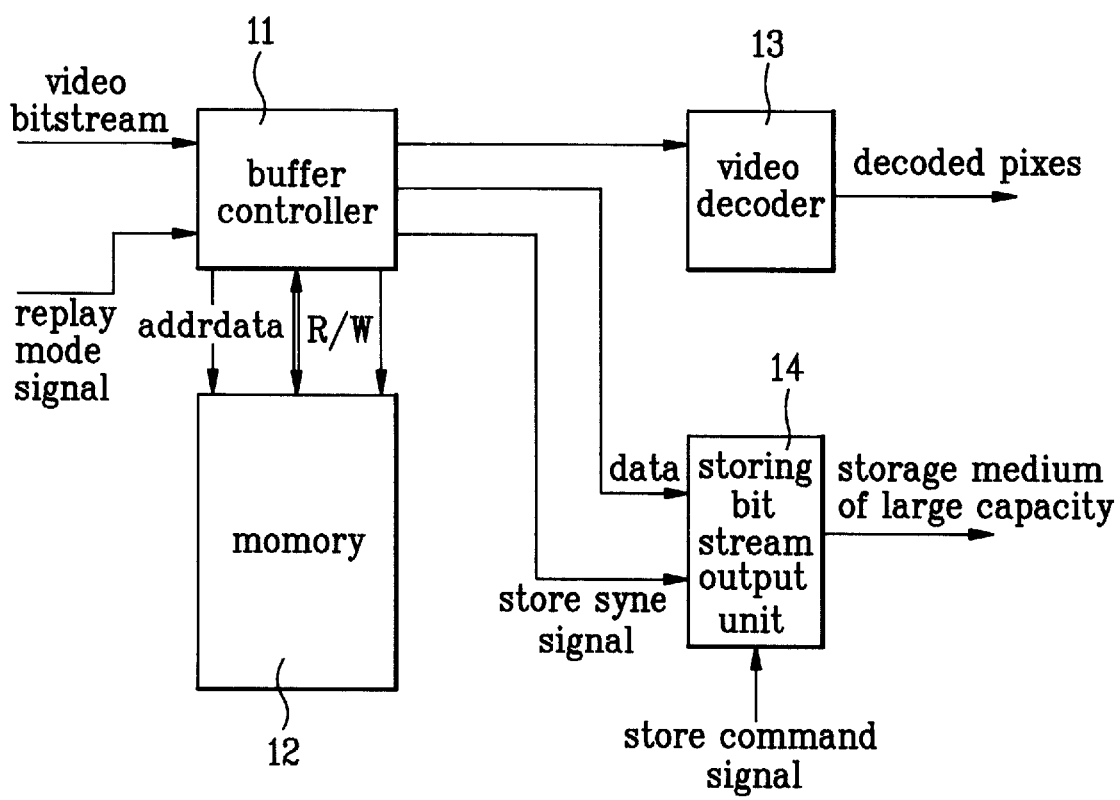
FIG. 1 is a block diagram showing a configuration of an MPEG video decoding apparatus for supporting replay according to the present invention.

As shown in FIG. 1, an MPEG video decoding apparatus for supporting replay according to the present invention comprises: a memory 12 for temporarily storing a predetermined amount of input video bit stream for use during replay; a buffer controller 11 for controlling write of an input video bit stream to the memory 12 and read of a video bit stream stored in the memory 12; a video decoder 13 for MPEG-decoding data which is read from the memory 12 and displaying it on a screen; and a store bit stream output unit 14 for storing the video bit stream read from the memory 12 and sending it to an outer storage medium of large capacity.

To control store of a video bit stream in the memory 12 and read of a video bit stream from the memory 12, the buffer controller 11 supplies an input video bit stream (data), read and write signals (R/W), and read and write addresses (addr) to the memory 12.

In other words, a digital TV employing MPEG technology selects and decodes one of multiple channels received via an antenna. Subsequently, the digital TV selects one of multiple programs contained in the selected channel and divides it into packets of audio bit stream data and packets of video bit stream data. The divided video bit stream is applied to the buffer controller 11.

The video decoder 13 removes an overhead (e.g. various header information and a start code) from a video bit stream which is read from the memory 12 by the buffer controller 11 and performs variable length decoding (VLD) with respect to pure data information. The video decoder 13, in turn, performs inverse quantization, inverse discrete cosine transform (IDCT), and motion compensation using a motion vector with respect to the data information to restore original pixel values and outputs them to a monitor.

The memory 12 is formed in a manner of expanding a buffer for video buffering verification (VBV) for the replay. In other words, a video bit stream has been coded at a variable rate during variable length coding at a sending party before being sent to the buffer controller 11. The VBV buffer is needed to temporarily store the video bit stream transmitted from the sending party via the buffer controller 11 and sends it to the video decoder 13 at a fixed rate. The video decoder 13 basically fetches data corresponding to a single picture from the VBV buffer at a time at intervals of a predetermined time according to the control of the buffer controller 11.

Accordingly the present invention implements the replay in such a manner of sequentially storing an input video bit stream in the expanded VBV buffer and controlling read addressing of the video bit stream according to a replay mode signal. A size of the expanded memory determines an amount of data to be replayed or a replay time.

Figure 2A:
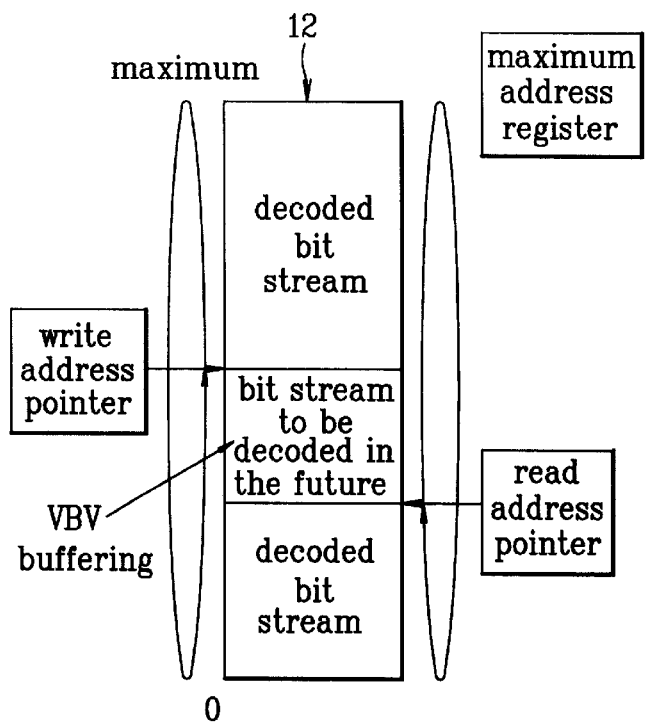
FIG. 2a illustrates how addressing is performed in a memory during normal decoding according to the present invention.

Referring to FIG. 2a, addressing of the memory 12 during normal decoding is performed using a write address pointer, a read address pointer, and a maximum address register. The write address pointer stores a write address in the memory 12 where a current input bit stream will be stored. Once a bit stream corresponding to a single data word is stored in an address designated by the write address pointer, "1" is added to the write address pointer to designate an address where the next input bit stream will be stored.

Similarly, the read address pointer stores a read address of the memory 12. Once a bit stream stored in the read address is read for decoding, "1" is added to the read address pointer, so the read address pointer stores the next read address. Here, the video bit stream read from the memory 12 is decoded by the video decoder 13.

The maximum address register contains the largest address of the memory, which changes according to the size of the memory. The maximum address register is needed for register of a maximum address when expanding the memory or when using only a part of the memory. The maximum address register may not exist. In this case, a central processing unit (CPU) or the like automatically checks the maximum address of the memory 12 and then sends a result of the check to the buffer controller 11.

When a write or read address stored in the write or read address pointer, which increases from "0" by one at a time when a bit stream is completely written or read, is equal to a value contained in the maximum address register, the write or read address pointer newly becomes "0" and repeats the previous procedure.

In other words, each address of the two address pointers is set to "0" at an initial start point (step 301). If a normal play command is identified (step 302), an input video bit stream is not read but just stored in the memory 12 for a predetermined period of time. In this case, only the write address pointer increases, but the read address pointer does not increase.

Here, accumulating the video bit stream in the memory 12 for the predetermined period of time is due to a VBV delay required by the video decoder 13. The VBV delay is a buffer delay allowing consecutive decoding of variable data without underflow.

Once the VBV delay time elapses, the video bit stream stored in the memory 12 is started to be read and decoded at a desired point. In this case, both the two address pointers increase together (step 303).

FIG. 2a shows status of the memory at a specified time while such operation as described above is being performed. Currently, the memory 12 has a bit stream to be decoded in the future and a bit stream which has already been read. In other words, the bit stream to be decoded corresponds to data which has not been read yet, and the decoded bit stream corresponds to data which has already been read and then MPEG-decoded at the video decoder 13.

The bit stream to be decoded is subject to VBV buffering and located an area between the write address pointer and the read address pointer. The data which has been read and retained in the memory, for example, a bit stream which has been decoded, remains in the memory until the next input bit stream is written onto the memory. The amount of the bit stream is proportional to the size of the memory expanded for the replay.

Figure 2B:
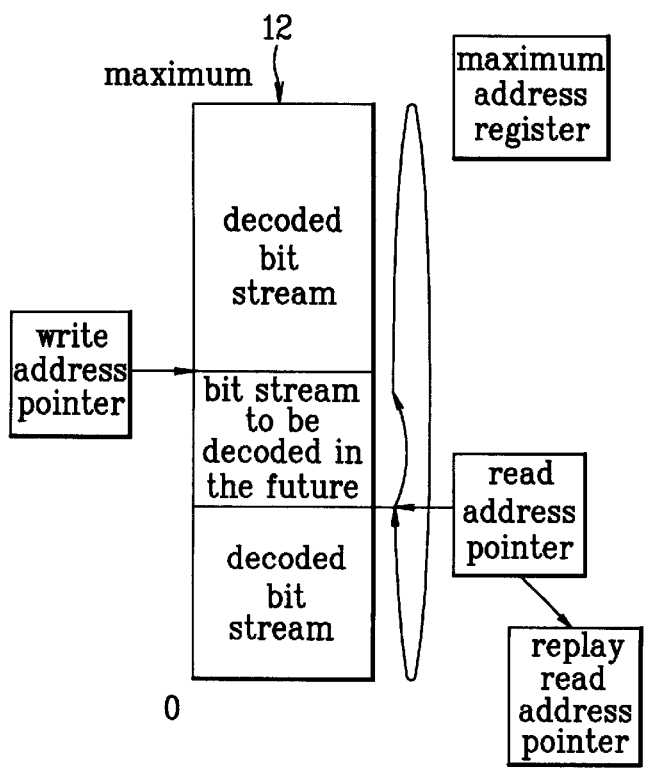
FIG. 2b illustrates how addressing is performed in a memory during replay decoding according to the present invention.
Figure 3:
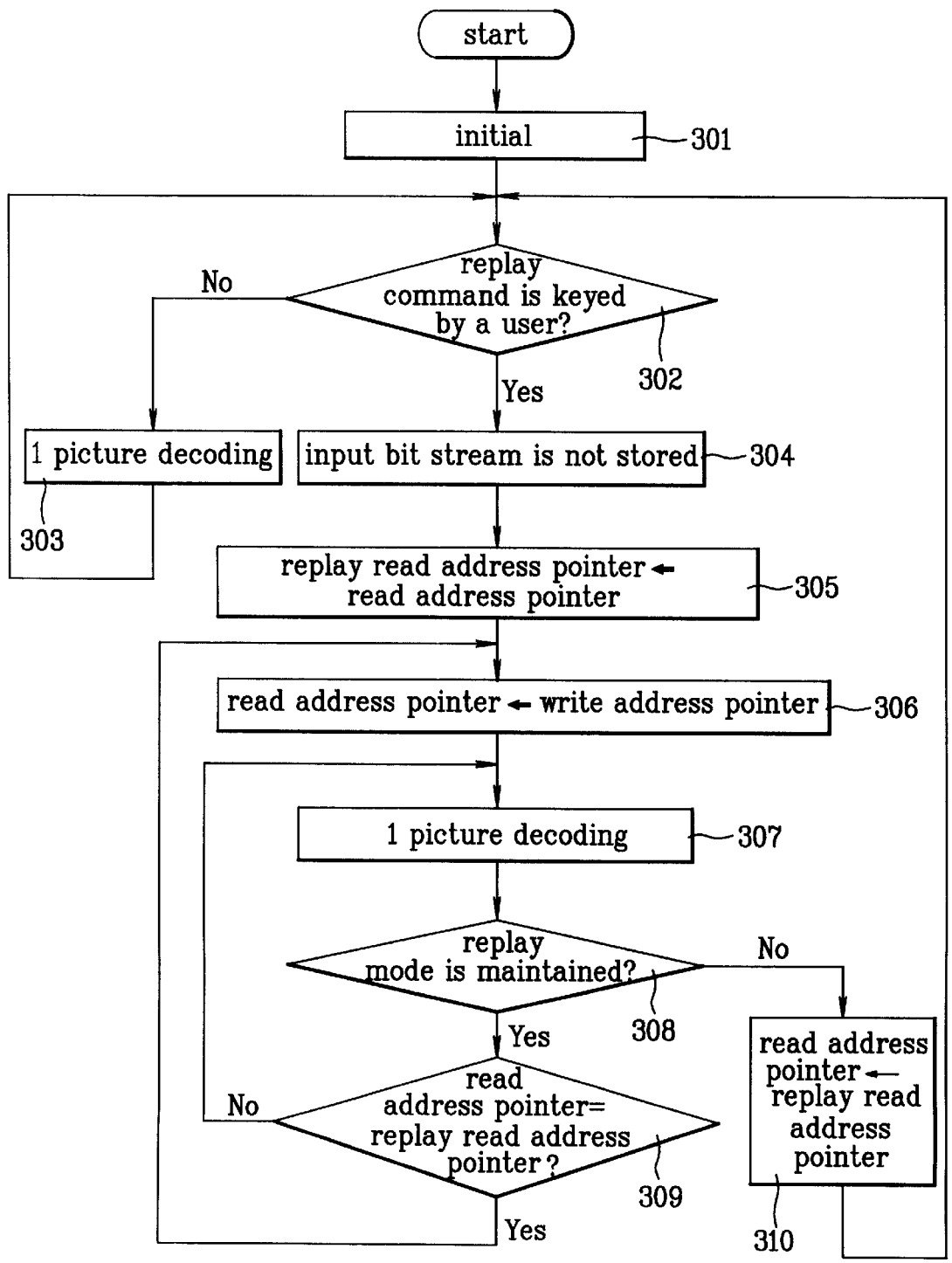
FIG. 3 is a flow chart of a decoding method by a controller during replay decoding according to the present invention.

As shown in FIG. 2b, compared with the normal decoding, a replay read address pointer is required in the replay decoding. The replay read address pointer contains an address of the read address pointer at the moment when a replay command is entered.

Specifically, while decoding and sequentially sending out an input bit stream as shown in FIG. 2a, if a replay command is keyed by a user (step 302), a sequent input bit stream is not stored, so the write address pointer is fixed as shown in FIG. 2b (step 304). In other words, once the replay command is keyed, the buffer controller 11 does not store but discards the sequent input video bit stream. Consequently, the write address pointer does not increase any more.

Simultaneously, an address of the read address pointer is stored in the replay read address pointer (step 305), an address designated by the write address pointer is stored in the read address pointer (step 306). Briefly speaking, a read address for decoding jumps to the address designated by the write address pointer. A bit stream corresponding to this address designated by the write address pointer is an earliest stored bit stream in the memory 12 since an address designated by the write address pointer indicates an address where a new input video bit stream will be written.

Subsequently, the video bit stream stored at the address designated by the read address pointer is read and decoded in the units of pictures at the video decoder 13, so the previous picture image is displayed on the screen (step 307), that is, the replay is effected. Once the video bit stream corresponding to a single word is completely read, the read address pointer increases by "1" and designates a next read address.

In this regard, when the replay mode is maintained (step 308), it is checked that an address of the read address pointer is equal to an address of the replay read address pointer while data designated by the read address pointer is being read and decoded for the replay (step 309).

When the address of the read address pointer is determined to be equal to the address of the replay read address pointer, this means that the previous picture image has been all decoded. A bit stream of the address designated by the read address pointer at this time is a new one which have never been read to be decoded, so the read address pointer jumps to an address designated by the write address pointer at the step 306 again. This means that another replay is started after the relay has been finished one time.

On the other hand, when the address of the read address pointer is determined to be different from the address of the replay read address pointer at the step 309, the procedure goes back to the step 307 to decode the bit stream in the units of the pictures and display the previous picture image.

When release of the replay mode is keyed by a user at the step 308 during the replay mode, a current address of the replay read address pointer is stored at the read address pointer to perform a normal play mode (step 310). The address of the read address pointer which was stored at the replay read address pointer to effect the replay at the step 305 is restored to original state. A sequent input bit stream is not discarded but written to an address designated by the write address pointer. When the amount of the bit stream stored at the address corresponds to a single word, the write address pointer increases by "1".

Simultaneously, a video bit stream stored at the address designated by the read address pointer is read to be decoded and, as a result, the read address pointer increases by "1".

Until the replay command is re-entered, both the write and read address pointers increase according to the write and read of an input video bit stream, thus performing the normal play, that is, presently received broadcast is displayed in normal.

Additionally, when the replay mode is selected by a user, the buffer controller 11 sends a store sync signal and a video bit stream read from the memory 12 to the store bit stream output unit 14 to store them in the unit 14. When a store command signal is entered by a user, the store bit stream output unit 14 sends the stored bit streams to a storage medium of large capacity (e.g., a VCR tape or a hard disc of a personal computer), so the user may watch the picture image corresponding to the stored bit stream later when necessary.

Figure 4:
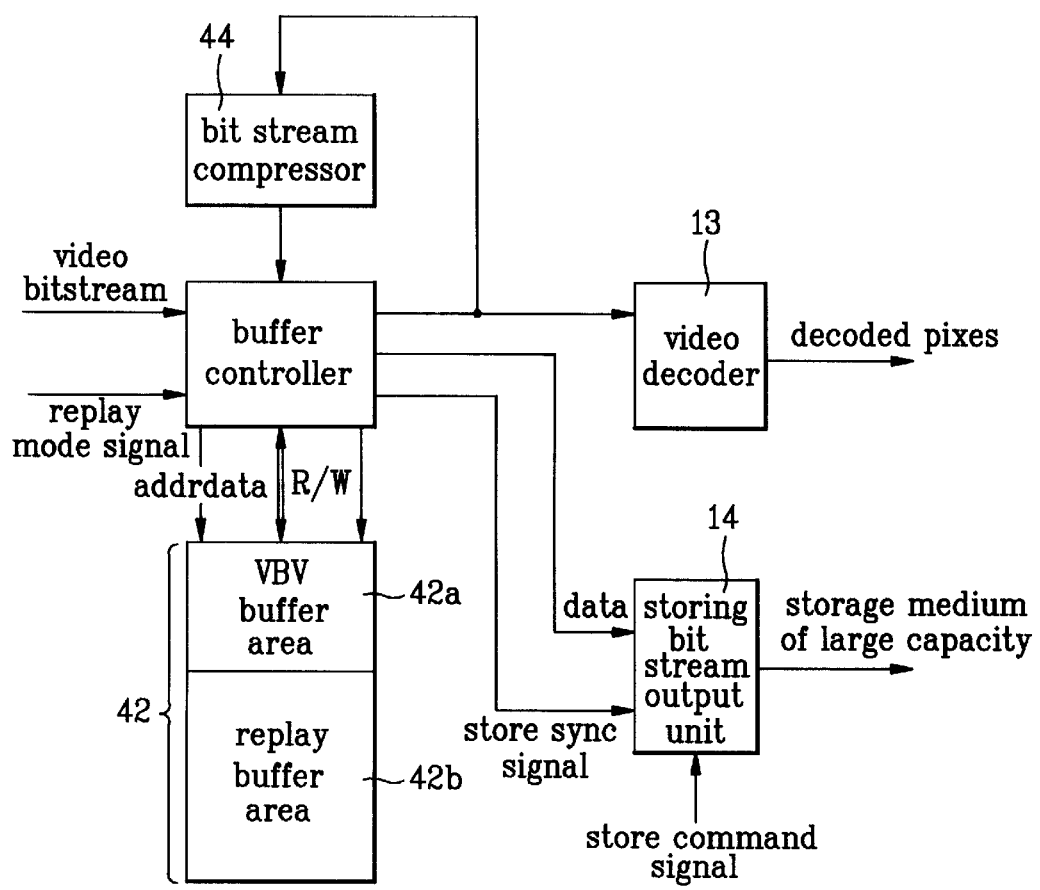
FIG. 4 is a block diagram showing a configuration of another embodiment of an MPEG video decoding apparatus for supporting replay according to the present invention.

Referring to FIG. 4, another embodiment of the video decoding apparatus according to the present invention comprises a buffer controller 41, a memory 42, a video decoder 43, a bit stream compressor 44, and a store bit stream output unit 45.

The memory 42 is divided into a VBV buffer area 42a for storing a video bit stream for a delay time necessary for decoding and a replay buffer area 42b for storing a predetermined amount of a previous video bit stream to be replayed. A video bit stream transmitted according to control of the buffer controller 41 is sequentially stored in the VBV buffer area 42a, and a video bit stream compressed for the replay is sequentially stored in the replay buffer area 42b. Hence, the buffer controller 41 successively reads data stored in the VBV buffer area 42a in the memory 42 and sends the data to the video decoder 43 at the normal play mode while it successively reads data stored in the replay buffer area 42b in the memory 42 and sends the data to the video decoder 43 at the replay mode.

FIG. 4 shows the case where an existing memory is expanded as much as the replay buffer area. The VBV buffer area and the replay buffer area exist in one memory as shown in the memory 42 depicted in FIG. 4, but two separate memories may be used for each buffer area.

Since the memory 42 is divided into the VBV buffer area 42a and the replay buffer area 42b, the buffer controller 41 is not needed to specially control addressing in the memory 42. The buffer controller 41 sends write and read addresses to the VEV buffer area 42a or the replay buffer area 42b in regular sequence according to the normal play mode or the replay mode and successively stores an input bit stream in either of the two buffer areas. According to the normal play mode or the replay mode, the buffer controller 41 successively reads the bit stream starting with the earliest stored portion from the VBV buffer area or the replay buffer area 42b and sends it to the video decoder 43.

When in the normal play mode, the buffer controller 41 stores a video bit stream transmitted thereto in the VBV buffer area 42a of the memory 42 in regular sequence. If the system is in initial state, the input video bit stream is not read but just stored in the VBV buffer area 42a of the memory 42 for a predetermined period of time. Once the bit stream is stored for a period of time as long as a VBV delay necessary for decoding, the buffer controller 41 starts to read the video bit stream from the VBV buffer area 42a and the video decoder 43 receives and decodes the video bit stream.

Specifically, the buffer controller 41 reads a bit stream corresponding to an amount of a single picture at a time at regular intervals and sends it to the video decoder 43. The video decoder 43 removes an overhead (e.g., various header information and a start code) from the video bit stream read from the VBV buffer area 42a in the memory 42 and sequentially performs variable length decoding, inverse quantization, and IDCT with respect to pure data information to restore original pixel values. The video decoder 43, in turn, sends the restored original pixel values to a monitor.

While the buffer controller 41 sends the data read from the VBV buffer area 42a to the video decoder 43, at the same time, it also sends the data to the bit stream compressor 44.

The bit stream compressor 44 analyzes only the start code of the input bit stream to identify a coding type of a relevant picture followed by the picture start code and skips bidirectional frame (B-frame) data or B-frame and predict frame (P-frame) data to compress the bit stream during the replay mode selectively entered from the outside. The bit stream compressor 44 transmits only the compressed video bit stream via the buffer controller 41 to the replay buffer area 42b of the memory 42.

When in the replay mode, the bit stream compressor 44 compresses video data according to the following three modes: a mode of sending a whole input video bit stream via the buffer controller 41 to the replay buffer area 42b in the memory 42 as it is; a mode of skipping B-frame data and sending only intra-frame (I-frame) data and P-frame data; and a mode of skipping B-frame and P-frame data and sampling to send only I-frame data. Other additional modes may be set to compress the video bit stream using various methods.

The bit stream is compressed using the bit stream compressor 44 because the replay buffer area 42b in the memory 42 is limited. A replay time is determined by resolution of a picture frame desired by a user. For example, when only the I-frame picture data is stored, picture quality deteriorates, but most amount of previous picture image can be replayed.

Specifically, when the replay mode is selected during the normal play mode, the buffer controller 41 does not store an input bit stream in the VBV buffer area 42a and the replay buffer area 42b of the memory 41 any more but successively reads a bit stream starting with the earliest, previously stored portion from the replay buffer area 42b and sends it to the video decoder 43. At this time, the buffer controller 41 does not send the input bit stream to the bit stream compressor 44 but sends a store sync signal and a compressed bit stream to the store bit stream output unit 45.

The video decoder 43 decodes and displays the bit stream read from the replay buffer area 42b on a screen, so a user can watch replayed picture image. Until the replay mode is released, the bit stream stored in the replay buffer area 42b is repeatedly and cyclically read and decoded, so the user can watch the replayed picture images many times.

When a store command is entered in the replay mode, the store bit stream output unit 45 sends to the outer storage medium of large capacity, only one set of the bit stream from the first to the last stored in the replay buffer area 42b according to a store sync signal indicating a border of one set of the repeated bit stream.

When the replay mode is released by a user, the buffer controller 41 begins to store an input bit stream in the VBV buffer area 42a. The bit stream read from the VBV buffer area 42a is simultaneously sent to both the video decoder 43 and the bit stream compressor 44. The bit stream is compressed by the bit stream compressor 44 and subsequently stored at the replay buffer area 42b in the memory 42.

When overflow occurs at the VBV buffer area 42*a* or at the replay buffer area in the memory 42, a bit stream which was stored earliest is deleted from the memory 42.

The MPEG video decoding apparatus and method for supporting replay according to the present invention allows a user to watch replayed previous picture image when he/she is watching digital television, thereby significantly satisfying consumer's needs and, consequently, improving competitiveness of the product. Additionally, the present invention may compress a compressed video bit stream for the replay, thereby replaying much amount of previous picture image with a limited memory.

It will be apparent to those skilled in the art that various modifications and variations can be made in an MPEG video decoding apparatus and method for supporting replay of the present invention without deviating from the spirit or scope of the invention. Thus, it is intended that the present invention cover the modifications and variations of this invention provided they come within the scope of the appended claims and their equivalents.

What is claimed is:

1. A moving picture experts group (MPEG) video decoding apparatus for supporting replay, the apparatus comprising:
    memory means for storing a predetermined amount of an input video bit stream which will be decoded and/or replayed;
    buffer control means for controlling write of an input video bit stream to said memory means and read of a video bit stream stored in said memory means;
    video decoding means for MPEG-decoding a bit stream which is read from said memory means by said buffer control means; and
    a store bit stream output means for receiving and storing a video bit stream read from said memory means during a replay mode and sending it to an outer storage medium of large capacity according to a store command.

2. An MPEG video decoding apparatus according to claim 1, wherein said memory means is formed in such a manner of expanding a video buffering verification buffer for replay.

3. An MPEG video decoding apparatus according to claim 1, wherein said memory means comprises:
    a write address pointer for designating a next write address by increasing its value by one when a bit stream corresponding to a single word has been written;
    a read address pointer for designating a next read address by increasing its value by one when a bit stream corresponding to a single word has been read; and
    a replay read address pointer for storing an address of said read address pointer according to start of a replay mode.

4. An MPEG video decoding apparatus according to claim 3, wherein, if a replay command is entered, said buffer control means fixes said write address pointer, stores an address of said read address pointer in said replay read address pointer, jumps said read address pointer to an address designated by said write address pointer, and subsequently reads a bit stream starting with a portion corresponding to the address to which said read address pointer is jumped, before sending it to said video decoding means.

5. An MPEG video decoding apparatus according to claim 3, wherein said buffer control means jumps said read address pointer to an address of said write address pointer when an address of said read address pointer is equal to an address of said replay read address pointer.

6. An MPEG video decoding apparatus according to claim 3, wherein, if the replay mode is released, said buffer control means stores an address of said replay read address pointer in said read address pointer, stores an input bit stream in said memory means increasing said write address pointer, and reads a bit stream corresponding to an address designated by said read address pointer increasing said read address pointer.

7. An MPEG video decoding apparatus according to claim 3, wherein said buffer control means initializes said write address pointer to "0" when an address of said write address pointer is equal to a maximum address.

8. An MPEG video decoding apparatus according to claim 3, wherein said buffer control means initializes said read address pointer to "0" when an address of said read address pointer is equal to a maximum address.

9. In an MPEG video decoding method where an input video bit stream is temporarily stored and decoded, an MPEG video decoding method for supporting replay comprising the steps of:
    when in a replay mode, discarding the input video bit stream, instead of storing it in a memory which stores a predetermined amount of the input bit stream to be video-decoded and/or replayed, resulting in fix of a write address pointer;
    storing an address of a read address pointer in a replay read address pointer and storing an address of said write address pointer in said read address pointer; and
    subsequently reading and decoding a bit stream starting with a portion corresponding to the address of said read address pointer which is given by the address of said write address pointer while increasing said read address pointer, thereby performing the replay.

10. An MPEG video decoding method according to claim 9, wherein said reading and decoding step comprises the steps of:
    determining whether a normal play command is entered during a replay mode;
    if the normal play command is not entered, determining whether a current address of said read address pointer is equal to the address of said replay read address pointer; and
    if the two addresses are equal to each other, storing the address of said write address pointer in said read address pointer and reading and decoding the video bit stream corresponding to the address designated by said read address pointer which is given by the address of said write address pointer.

11. An MPEG video decoding method according to claim 10, further comprising the step of storing the address of said replay read address pointer in said read address pointer, storing an input bit stream so as to increase said write address pointer, and reading a bit stream corresponding to the address designated by said read address pointer so as to increase said read address pointer when said normal play command is entered.

12. An MPEG video decoding method according to claim 11, wherein said write address pointer is initialized to "0" if an address of said write address pointer is equal to a maximum address.

13. An MPEG video decoding method according to claim 11, wherein said read address pointer is initialized to "0" if an address of said read address pointer is equal to a maximum address.

14. An MPEG video decoding method according to claim 9, wherein said read address pointer is initialized to "0" if an address of said read address pointer is equal to a maximum address.

15. An MPEG video decoding me-hod according to claim 9, further comprising the step of sending a video bit stream which has been read to an outer storage medium of large capacity when a store command is entered during the replay mode.

16. An MPEG video decoding apparatus for supporting replay, the apparatus comprising:
- memory means divided into a video buffering verification (VBV) buffer area and a replay buffer area, for storing a video bit stream to be video-decoded in said VBV buffer area and storing a video bit stream to be replayed in said replay buffer area in regular sequence;
- buffer control means for controlling write of an input video bit stream to said memory means and read of a video bit stream stored in said memory means;
- video decoding means for MPEG-decoding a bit stream which is read from said VBV buffer area or said replay buffer area in said memory means by said buffer control means; and
- bit stream compressing means for compressing the bit stream transmitted from said VBV buffer area in said memory means according to control of said buffer control means and sending a compressed bit stream via said buffer control means to said replay buffer area in said memory means.

17. An MPEG video decoding apparatus according to claim 16, wherein said memory means comprises a VBV buffer and a replay buffer.

18. An MPEG video decoding apparatus according to claim 16, wherein said bit stream compressing means sends an input bit stream as it is to said replay buffer area in said memory means via said buffer control means.

19. An MPEG video decoding apparatus according to claim 16, wherein said bit stream compressing means sends only intra-frame (I-frame) data and predict frame (P-frame) data of an input bit stream to said replay buffer area in said memory means via said buffer control means.

20. An MPEG video decoding apparatus according to claim 16, wherein said bit stream compressing means sends only I-frame data of an input bit stream to said replay buffer area in said memory means via said buffer control means.

21. An MPEG video decoding apparatus according to claim 16, further comprising a store bit stream output means for receiving and storing a video bit stream read from said replay buffer area in said memory means during a replay mode and sending it to an outer storage medium of large capacity according to a store command.

22. A moving picture experts group (MPEG) video decoding apparatus for supporting replay, the apparatus comprising:
- memory device that stores a predetermined amount of an input video bit stream which will be decoded and/or replayed;
- buffer controller that controls a writing of an input video bit stream to said memory device and a reading of a video bit stream stored in said memory device; and
- video decoder that decodes an MPEG bit stream which is read from said memory device by said buffer controller, wherein said memory device is formed in such a manner of expanding a video buffering verification buffer for replay.

23. A moving picture experts group (MPEG) video decoding apparatus for supporting replay, the apparatus comprising:
- memory device that stores a predetermined amount of an input video bit stream which will be decoded and/or replayed;
- buffer controller that controls a writing of an input video bit stream to said memory device and a reading of a video bit stream stored in said memory device; and
- video decoder that decodes an MPEG bit stream which is read from said memory device by said buffer controller, wherein said memory device includes:
  - a write address pointer for designating a next write address by increasing its value by one when a bit stream corresponding to a single word has been written,
  - a read address pointer for designating a next read address by increasing its value by one when a bit stream corresponding to a single word has been read, and
  - a replay read address pointer for storing an address of said read address pointer according to start of a replay mode.

* * * * *